July 7, 1970
J. WAGNER
3,518,898
TORQUE-SPEED CONVERTER
Filed Aug. 26, 1969
2 Sheets-Sheet 1
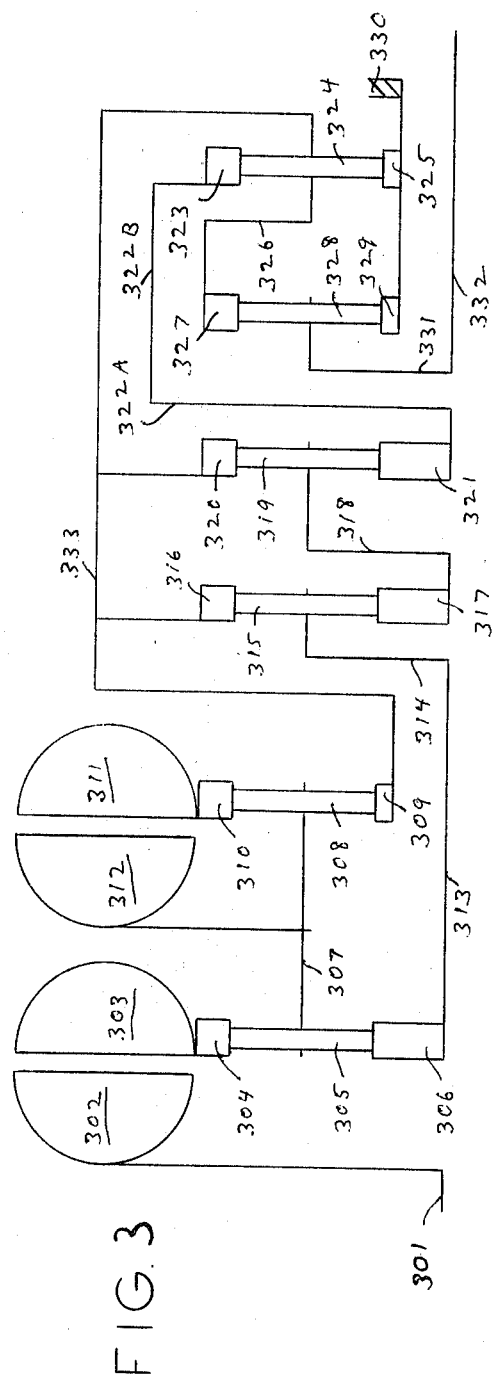
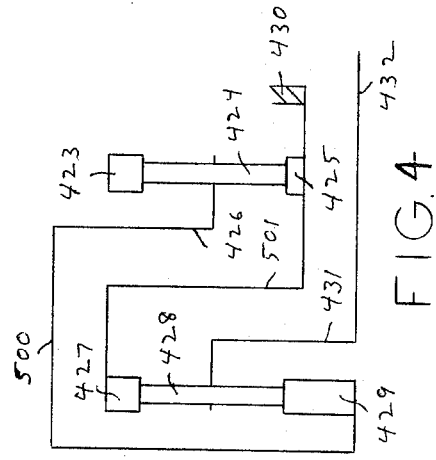
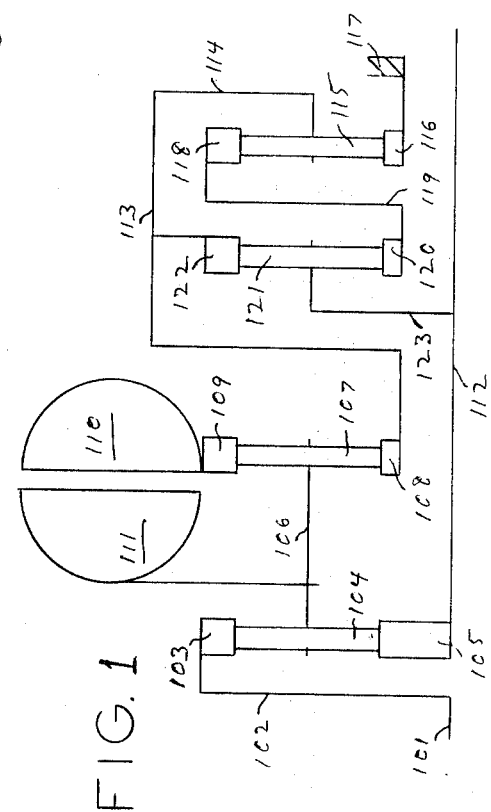

July 7, 1970 J. WAGNER 3,518,898
TORQUE-SPEED CONVERTER
Filed Aug. 26, 1969 2 Sheets-Sheet 2
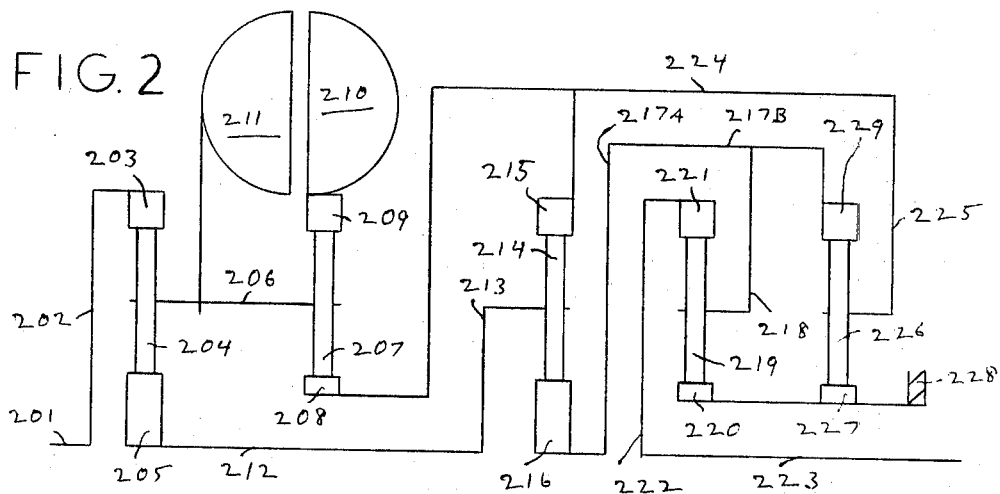
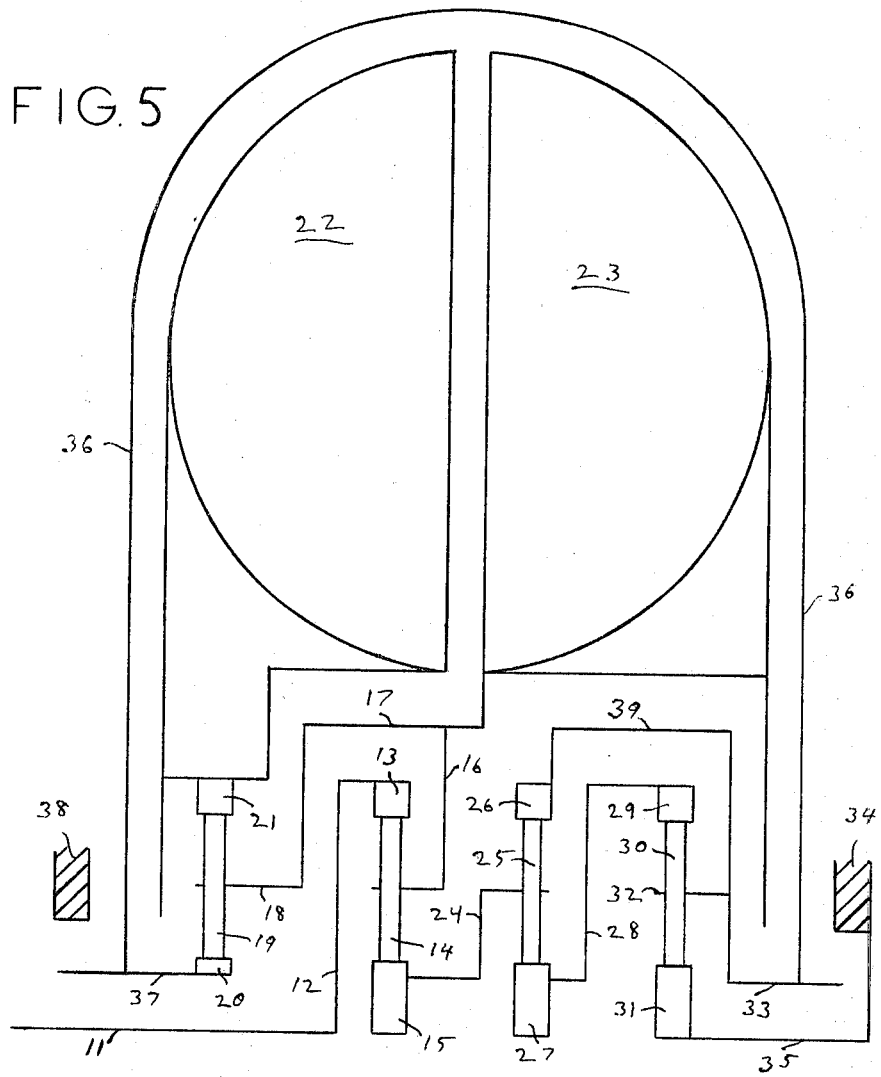

United States Patent Office 3,518,898
Patented July 7, 1970

3,518,898
TORQUE-SPEED CONVERTER
Jerome Wagner, 23 Clinton St., New York, N.Y. 10002
Continuation-in-part of application Ser. No. 713,445,
Mar. 15, 1968. This application Aug. 26, 1969, Ser.
No. 853,039
Int. Cl. F16h 3/74, 5/52, 47/08
U.S. Cl. 74—682
3 Claims

ABSTRACT OF THE DISCLOSURE

An automatic mechanical power transmission that continuously converts power to the most efficient speed in the range of speeds that varies from the slowest ("infinite" torque) to the fastest ("infinite" speed), in infinitely variable gradations, in a "flexible" manner, in either direction, without any adjusting of the transmission. The "flexibility" is achieved by utilizing plural power paths through as few as three planetary gear sets, without the use of friction brakes.

CROSS-REFERENCES TO RELATED APPLICATIONS

The present application is a continuation-in-part, of my two applications; Ser. No. 713,445, filed Mar. 15, 1968, now abandoned, which is a continuation-in-part, of my application, Ser. No. 598,280, filed Dec. 1, 1966, which was abandoned.

BACKGROUND OF THE INVENTION

This invention pertains to the field of mechanical power transmission.

Prior so-called automatic transmissions can be divided into two broad categories; (1) those that utilize a fluid coupling, a planetary gear set, and friction brakes; and (2) those that utilize a hydro-dynamic torque transmitting device which, of course, includes a one-way control mechanism. When, as is usually the case, an even higher torque capacity is necessary in such transmission, it too would also require a planetary gear set and friction brakes such as clutch discs and/or brake bands.

The use of friction brakes prevents "flexibility" of operation. The use of a hydro-dynamic torque transmitting device prevents reverse operation.

The present transmission ("torque-speed converter") continuously converts power to the most efficient speed in the range of speeds that varies from the slowest "infinite" torque) to the fastest ("infinite" speed), in infinitely variable gradations, in a "flexible" manner, in either direction, without any adjusting of the transmission.

SUMMARY OF THE INVENTION

This invention is an automatic mechanical power transmission that continuously converts power to the most efficient speed in the range of speeds that varies from the slowest ("infinite" torque) to the fastest ("infinite" speed) in infinitely variable gradations, in a "flexible" manner, in either direction, without any adjusting of the transmission. The "flexibility" is achieved by utilizing plural power paths through as few as three planetary gear sets, without the use of devices such as clutch discs, brake bands, one-way control mechanisms, or any other devices that would involve more than the normal mechanical friction than would occur (in this case), for example, in components such as shafts, bearings, and planetary gear sets.

Ideally, there would be no limits to the highest torque, and fastest speed, obtainable. In actual practice, of course, torque, and speed, would be limited by factors that include the power, load, and materials involved.

The torque-speed converter utilizes a slipping coupling. Any appropriate slipping coupling might be used.

The principal object of this invention is to provide a "torque-speed converter"; that is, the most completely automatic transmission.

Another object of this invention is to provide a torque-speed converter where high speed is the basic consideration.

Another object of this invention is to provide a torque-speed converter where high torque is the basic consideration.

Another object of this invention is to provide a torque-speed converter with a "shell"-shaft, which is highly adaptable, for example, to bicycles, scooters, motorcycles. etc.

BRIEF DESCRIPTION OF THE DRAWINGS

In the drawings; each is one-half of a schematic longitudinal cross section.

Wherein:

FIG. 1 is a "normal" torque-speed converter.

FIG. 2 is a torque-speed converter for use where high speed is the basic consideration.

FIG. 3 is a torque-speed converter for use where high torque is the basic consideration.

FIG. 4 is a modification of part of the torque-speed converter in FIG. 3. The modification results in an even higher torque capacity.

FIG. 5 is a "shell"-shaft type torque-speed converter.

DESCRIPTION OF THE PREFERRED EMBODIMENTS

Referring to FIG. 1:

If engine speed is not sufficient to enable the torque-speed converter to move, for example, a motor vehicle, the following state of conditions is effected:

"Idle" state

Rotation of driving shaft 101 rotates connected flange 102 which rotates connected internal gear 103 which rolls planet gear 104 around sun gear 105, thereby causing rotation of planet carrier 106 which rolls planet gear 107 around sun gear 108.

While sun gears 105 and 108 remain stationary, no power is transmitted to wheels.

If a change of conditions occurs, (such as, for example, an increase in engine speed) which makes it possible to move vehicle, the following range is reached:

Torque-multiplication range

Rolling of planet gear 107 around sun gear 108, thereby causes rotation of internal gear 109 which rotates connected component 110 of slipping coupling 110–111 whose component 111 rotates connected planet carrier 106 which causes planet gear 104 to rotate sun gear 105 which rotates connected driven shaft 112, thereby causing vehicle to move.

If the need for torque multiplication is diminished, and continues to diminish, driven shaft 112 will eventually rotate at the same speed as driving shaft 101.

If a change of conditions occurs which makes it possible to move vehicle faster, without a corresponding increase in engine speed, the following stage is reached:

Overdrive stage

Rotation of planet carrier 106, thereby causes planet gear 107 to rotate sun gear 108 which rotates connected housing 113 which rotates connected planet carrier 114 which rolls planet gear 115 around sun gear 116 (which is connected to stationary housing 117), thereby causing rotation of internal gear 118 which rotates connected flange 119 which rotates connected sun gear 120 which rolls planet gear 121 inside internal gear 122 (which is connected to housing 113), thereby causing planet carrier 123 to rotate connected driven shaft 112 at a faster speed than driving shaft 101.

If a subsequent change of conditions occurs which makes it possible to move vehicle even faster, without a corresponding increase in engine speed, the following range is reached:

"Infinite" speed-multiplication range

Rotation of driven shaft 112 rotates connected sun gear 105 which rolls planet gear 104 inside internal gear 103, thereby causing rotation of planet carrier 106, thereby causing an increase in speed of slipping coupling 110–111, thereby causing an increase in speed of vehicle. This speed-increase cycle continues until maximum speed under given conditions is reached.

The torque-speed converter in FIG. 1 can work with as few as three planetary gear sets by dispensing with planetary gear set 120–121–122 and planet carrier 123. Flange 119 would be connected to driven shaft 112.

Flange 102 can be replaced by a slipping coupling. (This will be more fully understood from description of FIG. 3.)

Referring to FIG. 2:

If engine speed is not sufficient to enable the torque-speed converter to move, for example, a motor vehicle, the following state of conditions is effected:

"Idle" state

Rotation of driving shaft 201 rotates connected flange 202 which rotates connected internal gear 203 which rolls planet gear 204 around sun gear 205, thereby causing rotation of planet carrier 206 which rolls planet gear 207 around sun gear 208.

While sun gears 205 and 208 remain stationary, no power is transmitted to wheels.

If a change of conditions occurs, (such as, for example, an increase in engine speed) which makes it possible to move vehicle, the following range is reached:

Torque-multiplication range

Rolling of planet gear 207 around sun gear 208, thereby causes rotation of internal gear 209 which rotates connected component 210 of slipping coupling 210–211 whose component 211 rotates connected planet carrier 206 which causes planet gear 204 to rotate sun gear 205 which rotates connected shaft 212 which rotates connected planet carrier 213 which causes planet gear 214 to exert a torque on internal gear 215 and on sun gear 216 which rotates connected flange 217A of housing 217A–217B whose drum 217B rotates connected planet carrier 218 which rolls planet gear 219 around sun gear 220, thereby causing internal gear 221 to rotate connected flange 222 which rotates connected driven shaft 223, thereby causing vehicle to move.

If the need for torque multiplication is diminished, and continues to diminish, driven shaft 223 will eventually rotate at the same speed as driving shaft 201.

If a change of conditions occurs, which makes it possible to move vehicle faster, without a corresponding increase in engine speed, the following stage is reached:

Overdrive stage

Rotation of planet carrier 206, thereby causes planet gear 207 to rotate sun gear 208 which rotates connected housing 224 which rotates connected planet carrier 225 which rolls planet gear 226 around sun gear 227 (which is connected to sun gear 220 and to stationary housing 228) thereby causing rotation of internal gear 229 which rotates connected planet carrier 218, thereby causing driven shaft 223 to rotate at a faster speed than driving shaft 201.

If a subsequent change of conditions occurs which makes it possible to move vehicle even faster, without a corresponding increase in engine speed, the following range is reached:

"Infinite" speed-multiplication range

Rotation of internal gear 229 rotates connected housing 217A–217B which rotates connected sun gear 216 which rolls planet gear 214 inside internal gear 215 (which is connected to housing 224), thereby causing rotation of planet carrier 213 which rotates connected shaft 212 which rotates connected sun gear 205 which rolls planet gear 204 inside internal gear 203, thereby causing rotation of planet carrier 206, thereby causing an increase in speed of slipping coupling 210–211, thereby causing an increase in speed of vehicle. This speed-increase cycle continues until maximum speed under given conditions is reached.

The purpose of additional "overdrive" planetary gear set 220–219—221, is to diminish to a greater degree, the speed of slipping coupling 210–211, when torque-speed converter operates within driving range. Planetary gear set 220–219–221, planet carrier 218, drum 217B, and flange 222, can, of course, be omitted when conditions permit. Internal gear 229 would be connected to remaining flange 217A which would be connected to driven shaft 223.

Flange 202 can also be replaced by a slipping coupling.

Referring to FIG. 3:

If engine speed is not sufficient to enable the torque-speed converter to move, for example, a motor vehicle, the following state of conditions is effected:

"Idle" state

Rotation of driving shaft 301 rotates connected component 302 of slipping coupling 302–303 whose component 303 rotates connected internal gear 304 which rolls planet gear 305 around sun gear 306, thereby causing rotation of planet carrier 307 which rolls planet gear 308 around sun gear 309.

While sun gears 306 and 309 remain stationary, no power is transmitted to wheels.

If a change of conditions occurs (such as, for example, an increase in engine speed) which makes it possible to move vehicle, the following range is reached:

Torque-multiplication range

Rolling of planet gear 308 around sun gear 309, thereby causes rotation of internal gear 310 which rotates connected component 311 of slipping coupling 311–312 whose component 312 rotates connected planet carrier 307 which causes planet gear 305 to rotate sun gear 306 which rotates connected shaft 313 which rotates connected planet carrier 314 which causes planet gear 315 to exert a torque on internal gear 316 and on sun gear 317 which rotates connected planet carrier 318 which causes planet gear 319 to exert a torque on internal gear 320 and on sun gear 321 which rotates connected flange 322A of housing 322A–322B whose drum 322B rotates connected internal gear 323 which rolls planet gear 324 around sun gear 325, thereby causing planet carrier 326 to rotate connected internal gear 327 which rolls planet gear 328 around sun gear 329 (which is connected to sun gear 325 which is connected to stationary housing 330), thereby causing rotation of planet carrier 331 which rotates connected driven shaft 332, thereby causing vehicle to move.

If the need for torque multiplication is diminished, and continues to diminish, the following phase is reached:

Rotation of planet carrier 307, thereby causes planet gear 308 to rotate sun gear 309 which rotates connected housing 333 which rotates connected planet carrier 326, thereby causing rotation of driven shaft 332.

If a change of conditions occurs, which makes it possible to move vehicle faster, without a corresponding increase in engine speed, the following range is reached:

"Infinite" speed-multiplication range

Rotation of planet carrier 326 rolls planet gear 324 around sun gear 325, thereby causing rotation of internal gear 323 which rotates connected housing 322A–322B which rotates connected sun gear 321 which rolls planet gear 319 inside internal gear 320 (which is connected to housing 333), thereby causing rotation of planet carrier 318 which rotates connected sun gear 317 which rolls planet gear 315 inside internal gear 316 (which is connected to housing 333), thereby causing rotation of planet carrier 314 which rotates connected shaft 313 which rotates connected sun gear 306 which rolls planet gear 305 inside internal gear 304, thereby causing rotation of planet carrier 307, thereby causing an increase in speed of slipping coupling 311–312, thereby causing an increase in speed of vehicle. This speed-increase cycle continues until maximum speed under given conditions is reached.

The torque-speed converter in FIG. 3 can also work with as few as three planetary gear sets by dispensing with planetary gear sets 317–315–316, 321–319–320, and 329–328–327, planet carriers 314, 318, and 331, and drum 322B. Internal gear 323 would be connected to remaining flange 322A which would be connected to shaft 313. Planet carrier 326 would be connected to driven shaft 332.

Slipping coupling 302–303 is not really necessary when power source is, for example, a gas turbine engine, but it is useful for absorbing the mechanical shock from, for example, an internal-combustion piston engine. Slipping coupling 302–303 does, however, diminish the slip in slipping coupling 311–312, by sharing the combined total slip with it, while vehicle is in motion, during which time, of course, speed-increase factor obtains.

Referring to FIG. 4:

An even greater torque capacity can be obtained from torque-speed converter in FIG. 3 by the following means:

In FIG. 3, internal gear 327 would be disconnected from planet carrier 326; sun gear 329 would be disconnected from sun gear 325; and depicted side of planet carrier 331 would be disconnected from driven shaft 332.

Planetary gear set 325–324–323 and planet carrier 326 would now be represented (in FIG. 4) by planetary gear set 425–424–423 and planet carrier 426. Planet carrier 426 is connected to housing 500 which is connected to sun gear 429 whose planet gear 428 is supported by planet carrier 431 which is connected to driven shaft 432. Stationary housing 430 is connected to sun gear 425 which is connected to flange 501 which is connected to internal gear 427 of planetary gear set 429–428–427.

Referring to FIG. 5:

Applied to a bicycle, for example, if pedalling speed is not sufficient to enable the torque-speed converter to move bicycle, the following state of conditions is effected:

"Idle" state

Rotation of driving shaft 11 rotates connected flange 12 which rotates connected internal gear 13 which rolls planet year 14 around sun gear 15, thereby causing planet carrier 16 to rotate connected housing 17 which rotates connected planet carrier 18 which rolls planet gear 19 around sun gear 20.

While sun gears 15 and 20 remain stationary, no power is transmitted to wheel.

If a change of conditions occurs (such as, for example, an increase in pedalling speed) which makes it possible to move bicycle, the following range is reached:

Torque-multiplication range

Rolling of planet gear 19 around sun gear 20, thereby causes rotation of internal gear 21 which rotates connected component 22 of slipping coupling 22–23 whose component 23 rotates connected housing 17 which rotates connected planet carrier 16 which causes planet gear 14 to rotate sun gear 15 which rotates connected planet carrier 24 which causes planet gear 25 to exert a torque on internal gear 26 and on sun gear 27 which rotates connected flange 28 which rotates connected internal gear 29 which rolls planet gear 30 around sun gear 31, thereby causing planet carrier 32 to rotate connected shaft 33 (which extends under bicycle frame stay 34 which is connected to shaft 35 which is connected to sun gear 31). Rotation of shaft 33 rotates connected driven shell 36, thereby causing bicycle to move.

If the need for torque-multiplication is diminished, and continues to diminish, the following phase is reached:

Rotation of planet carrier 18, thereby causes planet gear 19 to rotate sun gear 20 which rotates connected shaft 37 (which extends under bicycle frame stay 38), thereby causing rotation of connected driven shell 36.

If a change of conditions occurs, which makes it possible to move bicycle faster, without a corresponding increase in pedalling speed, the following range is reached:

"Infinite" speed-multiplication range

Rotation of driven shell 36 rotates connected shaft 33 which rotates connected planet carrier 32 which rolls planet gear 30 around sun gear 31, thereby causing rotation of internal gear 29 which rotates connected flange 28 which rotates connected sun gear 27 which rolls planet gear 25 inside internal gear 26 (which is connected to housing 39 which is connected to planet carrier 32), thereby causing rotation of planet carrier 24 which rotates connected sun gear 15 which rolls planet gear 14 inside internal gear 13, thereby causing rotation of planet carrier 16, thereby causing an increase in speed of slipping coupling 22–23, thereby causing an increase in speed of bicycle. The speed-increase cycle continues until maximum speed under given conditions is reached.

The torque-speed converter in FIG. 5 can also work with as few as three planetary gear sets by dispensing with planetary gear set 27–25–26, planet carrier 24, and housing 39. Flange 28 would be connected to sun gear 15.

In order to provide a "floating axle" effect, shafts 33 and 37 extend under frame stays 34 and 38, respectively.

The use of slipping coupling provides a braking effect when power source is not moving vehicle, bicycle, etc.; and bicycles, for example, can be slowed down, stopped, or reversed, by reverse pedalling.

Amounts and sizes of components would depend upon the way that the torque-speed converter is used.

Usefulness of the torque-speed converter is not limited to the above examples, and, of course, it is possible to modify the torque-speed converter, without departing from the spirit and scope of the invention as set forth in the following claims which are intended to include all such modifications.

I claim:

1. A mechanical power transmission comprising a driving shaft, a driven shaft, three planetary gear sets, two planet carriers, a slipping coupling, a stationary housing, and connecting elements; wherein the improvement comprises, the driving shaft operatively connected to the internal gear of the first planetary gear set whose planet gears are supported by one side of the first planet carrier whose other side supports the planet gears of the second planetary gear set whose internal gear is connected to one component of the slipping coupling whose other component is connected to the first planet carrier; the stationary housing connected to the sun gear of the third planetary gear set whose planet gears are supported by the second planet carrier which is connected to the sun gear of the second planetary gear set; the driven shaft operatively connected to the internal gear of the third planetary gear set and to the sun gear of the first planetary gear set.

2. A mechanical power transmission comprising a driving shaft, a driven shaft, three planetary gear sets, two planet carriers, a slipping coupling, a stationary housing, and connecting elements; wherein the improvement comprises, the driving shaft operatively connected to the internal gear of the first planetary gear set whose planet gears are supported by one side of the first planet carrier whose other side supports the planet gears of the second planetary gear set whose internal gear is connected to one component of the slipping coupling whose other component is connected to the first planet carrier; the stationary housing connected to the sun gear of the third planetary gear set whose planet gears are supported by the second planet carrier which is connected to the sun gear of the second planetary gear set; the driven shaft operatively connected to the second planet carrier; the third planetary gear set's internal gear operatively connected to the sun gear of the first planetary gear set.

3. A mechanical power transmission comprising a driving shaft, a driven shell-shaft, three planetary gear sets, three planet carriers, a slipping coupling, a stationary frame, and connecting elements; wherein the improvement comprises, the first planet carrier which supports the planet gears of the first planetary gear set whose internal gear is connected to one component of the slipping coupling whose other component is connected to the second planet carrier which supports the planet gears of the second planetary gear set whose sun gear is operatively connected to the internal gear of the third planetary gear set whose planet gears are supported by the third planet carrier which is connected to the shell-shaft which is connected to the sun gear of the first planetary gear set; the driving shaft connected to the internal gear of the second planetary gear set; the stationary frame connected to the sun gear of the third planetary gear set; the second planet carrier connected to the first planet carrier.

References Cited
UNITED STATES PATENTS

| | | | |
|---|---|---|---|
| 2,480,032 | 8/1949 | Kochis | 74—682 |
| 2,523,619 | 9/1950 | Grebb | 74—793 X |
| 3,241,400 | 3/1966 | Martin | 74—751 |

FOREIGN PATENTS

| | | |
|---|---|---|
| 670,940 | 4/1952 | Great Britain. |
| 1,015,596 | 1/1966 | Great Britain. |

OTHER REFERENCES

German printed application 1,130,660, May 1962.

DONLEY J. STOCKING, Primary Examiner

T. C. PERRY, Assistant Examiner

U.S. Cl. X.R.

74—688, 751